United States Patent Office 3,494,425
Patented Feb. 10, 1970

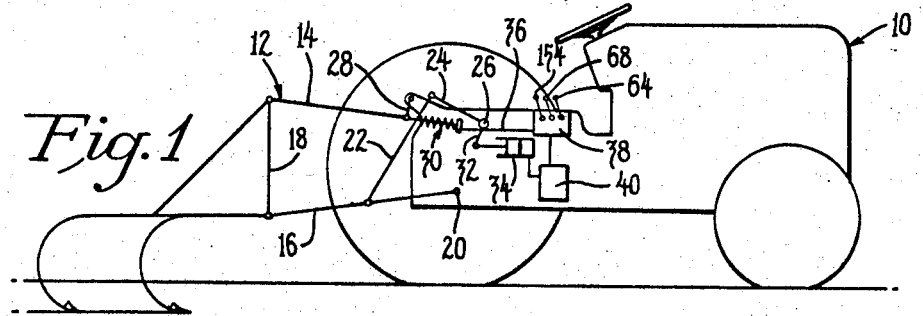
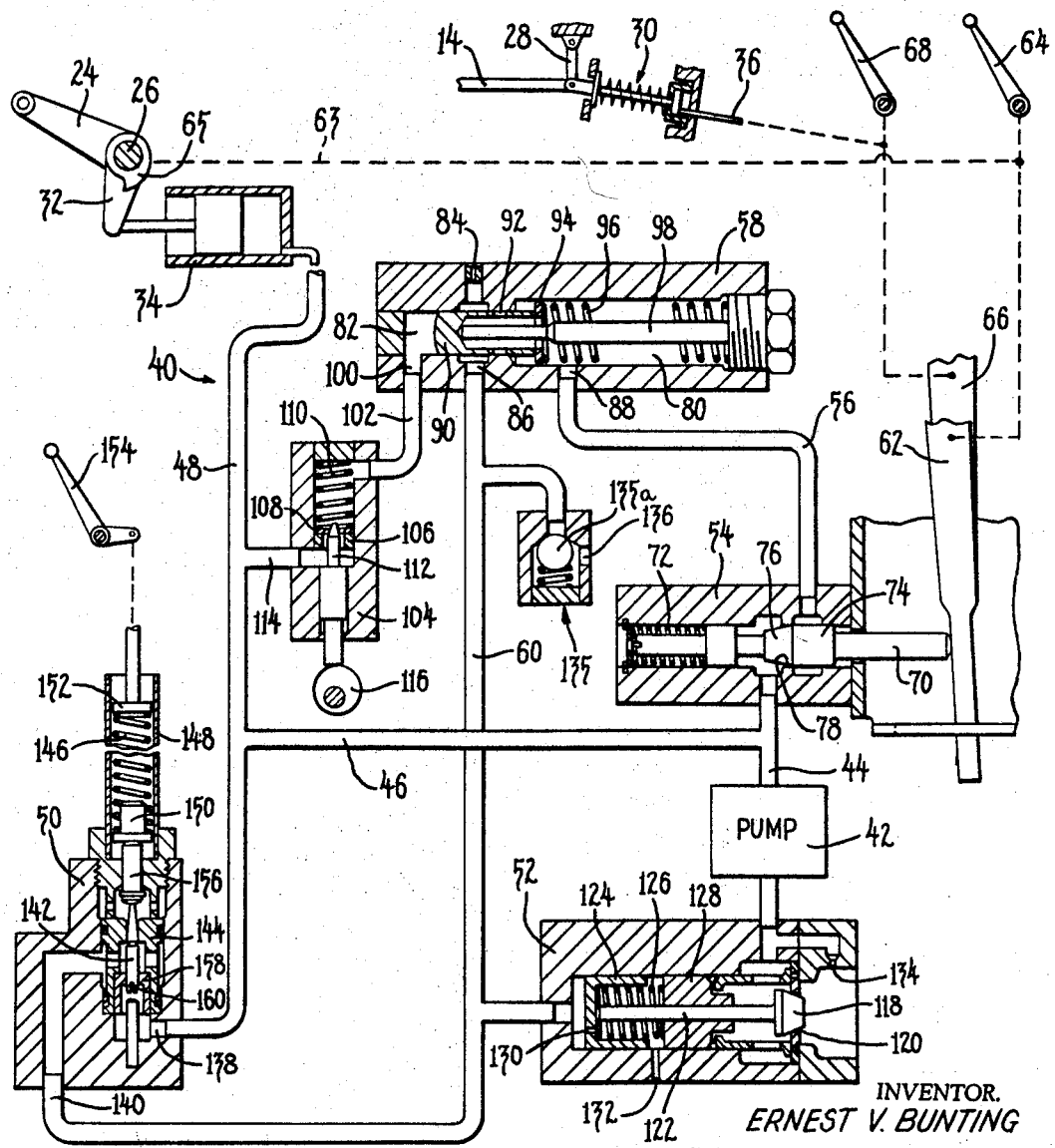

3,494,425
HITCH LINKAGE CONTROL SYSTEM
Ernest V. Bunting, Detroit, Mich., assignor to Massey-Ferguson Inc., Detroit, Mich.
Filed Nov. 1, 1966, Ser. No. 591,334
Int. Cl. A01b 63/112, 63/114
U.S. Cl. 172—9                                    15 Claims

ABSTRACT OF THE DISCLOSURE

A hydraulic control system for a three point hitch includes means to vary a hitch condition under draft control, position control or pressure control. Fluid is supplied to the actuator through a primary circuit by a pump, the intake of which is regulated by an intake valve. The intake valve is controlled by pressure in a secondary circuit, the pressure of which is controlled by either a pressure control valve or a flow control valve. The flow control valve selectively admits fluid from the primary to the secondary circuit, is controlled on one side by actuator pressure and on the other side by pressure from the pump through a main control valve. The main control valve is positioned by draft or position control linkages. Thus the supply of fluid to the pump is regulated by a pressure that is determined by the flow control valve which is controlled by the hitch condition sensing main control valve. In pressure control, the pressure in the primary circuit controls the pressure acting on the intake valve. Exhaust of fluid from the actuator is through the secondary circuit and sensitivity adjustment means are included.

---

This invention relates generally to agricultural tractors, and is particularly concerned with tractors having hydraulic hitch linkage control systems.

More particularly, the invention is concerned with hydraulic control systems, of the type known generally as the "Ferguson System," for tractors having a three-point hitch linkage wherein flow of hydraulic fluid to and from a hydraulic actuator for the hitch linkage is controlled in accordance with changes in a controlled hitch linkage condition. Such systems have been developed to provide for three types of hitch linkage control, namely, draft, position and pressure control.

Under draft control, a valve controlling flow to and from the hydraulic actuator is actuated in accordance with changes in the forces imposed on the hitch by the implement carried by the hitch. When the implement forces depart from a pre-selected value in one direction, fluid is admitted to the actuator to cause the hitch to be raised, and when the forces change in the opposite direction from the pre-selected value, fluid is discharged or drained from the actuator to lower the hitch linkage. An increase in the draft force acting on the implement tends to cause the valve to be actuated in a direction to admit fluid to the actuator and raise the hitch linkage, and conversely, a decrease in the draft force tends to actuate the valve in a direction to cause fluid to drain from the actuator and thereby lower the hitch linkage to increase the working depth of the implement. Thus, the working depth of the implement is controlled by maintaining a constant, pre-selected force on the hitch linkage. If the forces imposed on the hitch linkage by the implement deviate from the pre-selected value, the deviation is corrected by increasing or decreasing the working depth of the implement, and increases and decreases in the draft force tend to actuate the valve to respectively decrease and increase the working depth of the implement. An example of a draft control system is disclosed in Ferguson U.S. Patent 2,118,180, dated May 24, 1938.

With position control, an implement or load on the tractor hitch linkage is raised or lowered in accordance with the movement of a manual position control handle or similar device irrespective of changes in the magnitude of the load on the hitch. The tractor hitch, and the piston of the hydraulic actuator, have a position corresponding to every position of the position control lever within the range of movement of the latter. One example of a control system having position control is disclosed in Bunting U.S. Patent 2,996,124, dated Aug. 15, 1961.

A pressure control system provides, among other things, for the controlled transfer of weight to the tractor from an implement or trailer. The transferred weight is controlled by maintaining a constant, pre-selected pressure in the hydraulic actuator. When the pressure falls below the pre-selected value, fluid is admitted to the hydraulic actuator to increase the lifting force of the hitch linkage on the trailed implement to correct the pressure deviation. Conversely, when the load on the hitch increases, or changes such as to cause the hydraulic pressure to increase over the pre-selected value, fluid is drained from the actuator to correspondingly decrease the lifting force. An example of a pressure control system is disclosed in Bunting U.S. Patent 2,627,796 of Feb. 10, 1953.

In accordance with the present invention, the hydraulic control system includes two hydraulic circuits, one of which may be referred to as the primary circuit, and the other of which may be referred to as the secondary circuit. The hydraulic actuator for raising and lowering the tractor hitch is connected with the primary circuit, and a continuously driven pump has its output connected to deliver hydraulic fluid into the primary circuit. The pump intake is connected with a reservoir or sump containing hydraulic fluid through a pressure responsive valve which moves between open and closed positions to respectively connect and disconnect the pump intake with the reservoir. Delivery of hydraulic fluid into the primary circuit, and hence to the actuator, is therefore controlled by connecting or disconnecting the pump intake with the source of hydraulic fluid. The pressure responsive valve controlling the pump intake is connected into the secondary hydraulic circuit and moves between its open and closed positions in response to changes in the secondary circuit pressure.

Hydraulic fluid is delivered into the secondary circuit from the primary circuit through one of two hitch linkage condition responsive control valves, one of which operates in pressure control and the other of which operates in either draft or position control. The draft and position control valve is biased against a spring by draft and position control links or levers such that when the hitch condition calls for lowering the hitch, the control valve opens to permit fluid to drain from the actuator into the secondary circuit. The resulting rise in the secondary circuit pressure tends to cause the intake valve to close and disconnect the pump from the reservoir. Conversely, when a hitch raise signal is transmitted by the draft and position control levers, the draft and position control valve moves in a direction to shunt off communication between the primary circuit and the secondary circuit thereby causing the secondary circuit pressure to fall, and the intake valve consequently opens to permit more fluid to be pumped from the reservoir through the primary circuit to the actuator.

For pressure control operation, the draft and position control valve may be held closed, and the pressure control valve connects the secondary circuit with the primary circuit when the primary circuit pressure exceeds a value determined by the force of an adjustable spring biasing the pressure control valve toward its closed position against the primary circuit pressure.

Flow from the draft and position control valve is metered into the secondary circuit by a flow control valve having a slidable valve element subject on one side to the pressure on the output side of the draft and position control valve and on its other side to the primary circuit pressure. As the main, or draft and position control valve opens, the resulting pressure rise at the flow control valve, together with a spring, moves the flow control valve element toward the position in which it connects the secondary circuit to receive fluid flowing past the main control valve from the primary circuit. Preferably, pressure surges in the primary circuit are damped by an adjustable dashpot between the actuator and flow control valve. The secondary circuit has restricted communication with the reservoir with the result that the secondary circuit pressure always falls to sump pressure unless supplied with additional fluid through the flow control valve. To compensate for any leakage and the flow through the secondary circuit conection with the reservoir, a bypass orifice is provided in the intake valve through which a small amount of fluid can be pumped even when the intake valve is closed.

Therefore in position and draft control operation, the main control valve is actuated by the position and draft control levers between supply, discharge and neutral or balanced positions to respectively initiate delivery of hydraulic fluid to the actuator to raise the hitch linkage, initiate exhaust of hydraulic fluid from the actuator to lower the hitch linkage, and maintain a constant volume of hydraulic fluid at the actuator to hold the hitch in a selected, predetermined position relative to the tractor. In the "neutral" or "balanced" position, the main control valve permits a sufficient amount of flow into the secondary circuit to maintain the intake valve closed. The "balanced" or "neutral" position or condition may also be referred to as the "steady state" condition of the system, that is, the condition in which the volume of hydraulic fluid in the actuator cylinder neither decreases nor increases.

The objects, advantages and features of the invention will become apparent from the following description taken in connection with the accompanying drawings in which:

FIG. 1 is a diagrammatic elevational view of a tractor having a hydraulically actuated three-point hitch linkage embodying the invention;

FIG. 2 is a schematic view of the hydraulic control system.

FIG. 1 schematically illustrates a tractor 10 having a conventional three-point hitch linkage 12 including a top control link 14 and lower draft links 16, only one of which is visible in the drawings. Links 14 and 16 have their trailing ends pivotally connected to an A-frame member 18. Each lower link 16 has its forward end pivotally connected at 20 to the tractor chassis, and is connected intermediate its ends to one of a pair of drop links 22 (only one of which is visible) pivotally connected with one of a pair of lift arms 24 mounted on a rockshaft 26. The forward end of the control link 14 is pivotally connected to a rocker 28 pivotally mounted on the tractor, and is connected through rocker 28 with a draft spring assembly 30. Non-rotatably secured to rockshaft 26 is an arm 32 which is pivotally connected with the piston rod of a hydraulic actuator 34. The admission of hydraulic fluid into the cylinder of the actuator 34 tends to cause the piston to move toward the left as viewed in the drawing, and thereby cause lift arms 24 to raise the hitch linkage relative to the tractor. Conversely, the exhaust of hydraulic fluid from the cylinder of the hydraulic actuator tends to cause the piston to move toward the right and actuate the lift arm 24 downwardly to lower the hitch linkage relative to the tractor.

The draft spring assembly 30 includes a draft control rod 36 which extends to a control assembly or panel indicated schematically in FIG. 1 at 38. Rod 36 is interconnected with a hydraulic control system designated generally by reference numeral 40 through a linkage system indicated only diagrammatically by broken lines in FIG. 2.

The hydraulic control system 40 includes a pump 42 which is preferably of the type disclosed in Bunting U.S. Patent 3,142,316 and in the copending U.S. application of E. V. Bunting entitled, "Tractor Hydraulic Control System," Ser. No. 591,333, filed on Nov. 1, 1966, the entire disclosure of which is incorporated herein by reference. Pump 42 is driven continuously by the tractor engine and is controlled from the intake or suction side. The output line 44 of pump 42 is connected with the branch 46 of a primary hydraulic circuit which includes a line 48 communicating with the hydraulic actuator 34. Line 48 also communicates with a pressure control valve 50. Hydraulic fluid is admitted to pump 42 through an intake valve 52 which responds to changes in a controlled hitch linkage condition to connect or disconnect pump 42 with a sump or reservoir of hydraulic fluid. When the intake valve is in its closed position, the pumping action continues, the pump is in restricted communication with the reservoir through an orifice 134, and only a slight amount of fluid can be pumped from the reservoir.

The output line 44 of pump 42 is also connected with a main position and draft control valve 54 which in turn is connected through a line 56 with a flow control valve 58. The main control valve 54 responds to changes in the controlled hitch linkage condition to control communication between line 44 and line 56. The flow control valve 58 controls communication between line 56 and a secondary hydraulic circuit having a line 60 connected with both pressure control valve 50 and intake valve 52.

The main control valve 54 is actuated by either a position control lever 62 interconnected with a position control handle 64, or a draft control lever 66 interconnected with rod 36 and a draft control handle 68. Lever 62 is interconnected through a linkage 63, diagrammatically indicated by broken lines only, with a position control cam 65 non-rotatably secured to rockshaft 26. As will be pointed out in detail below, the position of the position control handle 64 determines the position of cam 65 at which the system is in a balanced, neutral or steady state condition, that is, a condition in which the amount of hydraulic fluid in the cylinder of the actuator is maintained constant. Similarly, the position of the draft control handle 68 determines the deflection of the draft spring required for a balanced or steady state condition. Stated another way, the position of handle 68 determines the draft spring deflection that will occur when the plow or implement connected to the hitch linkage is at its desired working depth.

The main control valve 54 includes a valve element 74 having an operating member 70 biased into engagement with levers 62 and 66 by a spring 72. Valve element 74 has a tapered portion 76 which controls flow through a port 78. Movement of valve element 74 toward the right, as viewed in the drawing, increases the rate of flow between lines 44 and 56 through the valve port 78. Conversely, movement of valve element 74 toward the left as viewed in the drawing reduces and shuts off communication between lines 44 and 56.

The flow control valve 58 is formed with a pair of coaxial chambers 80 and 82, chamber 82 being of smaller diameter than chamber 80. A restricted orifice 84 and a passage 86 communicate with an annular groove formed in the wall of chamber 82, orifice 84 communicating with exhaust or sump and port 86 communicating with line 60. Line 56 communicates with chamber 80 through a port 88. Slideable in chamber 82 is a hollow valve element 90 having a pair of diametrically opposed ports 92 through which chamber 80 can communicate with orifice 84 and passage 86. When valve element 90 shifts toward the left as viewed in FIG. 2, ports 92 communicate with orifice 84 and passage 86 to connect line 56 with orifice 84 and passage 86 through chamber 80. Valve element 90 is formed with an annular flange or washer 94 engaged with one end of a spring 96 which biases the valve element toward the left. Movement of valve element 90 toward the right is limited by a rod 98 which engages the left end wall of the valve element in the position shown in the drawing in a position closing ports 92. Chamber 82 communicates through a port 100 with a line 102, connected with an adjustable needle valve 104.

A cylindrical chamber is formed in the body of adjustable valve 104 in which an annular shoulder 106 is press fitted and seated against a ledge formed by the reduced cross-section of the chamber. Seated on the upper side of the shoulder 106 is an orifice plate or washer 108 which is biased against shoulder 106 by a spring 110. Flow through the orifice plate 108 is controlled by a tapered needle valve element 112. Thus the rate of flow through the orifice plate 108 is controlled by the tapered valve element 112 which moves upwardly to decrease the size of the orifice and thus the rate of flow through the orifice, and downwardly to increase the size of the orifice and plate 108 and hence increase the flow through the orifice from line 102. Valve 104 communicates with line 48 of the primary circuit through a branch 114 on the opposite side of orifice plate 108 from line 102. The position of needle valve 112, and hence the size of the orifice in plate 108, may be adjusted by an eccentric 116 engaged with valve 112. A surge of pressure in line 114 will cause plate 108 to move upwardly against spring 110 to equalize the pressure in lines 114 and 102.

The position of the needle valve 112 relative to orifice plate 108 determines the size of the passage in plate 108 and thus the rate at which hydraulic fluid can be expelled from chamber 82, and thereby determines how fast ports 92 are allowed to open and establish communication between lines 56 and 60.

Valve element 90 of the flow control valve is subjected to the pressure in line 102 on its left hand side, and to the pressure in line 56 on its right hand side. Therefore, an increase in the pressure in chamber 80 augments the force of spring 96 and tends to cause valve element 90 to move toward the left to connect chamber 80 with orifice 84 and passage 86. When the pressure in chamber 80 is sufficient to cause valve element 90 to move toward the left against the pressure in chamber 82, fluid will flow from line 56 through chamber 80 into line 60 through passage 86.

The intake valve 52 includes a valve element or poppet 118 which is moveable relative to a main intake port 120 to control communication between the reservoir and the pump intake. In the position shown in the drawing, valve element 118 is in a closed position relative to port 120 to shut off the flow to the pump. Valve element 118 has a rod 122 slideable in a bushing 128 and engaged with a piston 124. Piston 124 is biased toward the left against the pressure in line 60 by a spring 126. Piston 124 is formed with a restricted bleed port 130 through which fluid from line 60 can pass to an exhaust port 132 in the wall of the intake valve housing. When the poppet valve 118 is seated against port 120, a small amount of oil is available for the pump through a bypass orifice 134. Valve 118 is biased to an open position relative to port 120 by spring 126, and is moved to a closed position when the pressure in line 60 acting against piston 124 is sufficient to overcome spring 126. Thus, the valve moves to a closed position when there is sufficient hydraulic fluid at actuator 34, or when fluid is being exhausted from actuator 34. The bypass orifice 134 permits the pump to maintain sufficient pressure in line 60 to close valve 118.

This small amount of pumping will either cause the actuator piston to move slightly in a raising direction or a follow up of draft or position to slightly open valve 76 so that sufficient hydraulic fluid will be passed into the secondary circuit to keep valve element 118 closed. This is the steady state or neutral condition. Any additional hydraulic fluid escapes through relief valve 135. Relief valve 135 establishes a minimum pressure at actuator 34 which is sufficient to close the intake valve element 118. Orifice 84 provides for an additional bleeding off of hydraulic fluid in line 60 to prevent inadvertent actuation of intake valve 52 in the event of leakage of hydraulic fluid into line 60 around valve 90.

Considering the operation of the system described thus far, when the flow control valve element 90 is in the position shown in the drawings, there is no communication between line 56 and line 60, and the pressure in line 60 will thus tend to fall to reservoir or sump pressure. Intake valve element 118 is biased open by spring 126, and pump 42 will draw fluid from the reservoir through port 120 and deliver it into output line 44. With valve element 74 closed, as shown in the drawing the fluid pumped into line 44 is delivered to actuator 34 through line 48 causing lift arms 24 and the hitch linkage 12 to be raised relative to the tractor. If the tractor is being operated in position control, the resulting rotation of cam 65 will cause a follow up movement of lever 62 toward the right and permit the main control valve element 74 to open port 78. Fluid will then flow from the output line 44 through line 56 into chamber 80, and the resulting pressure rise in chamber 80 will shift valve element 90 toward the left to connect chamber 80 with orifice 84 and passage 86. As the fluid flows from line 56 through chamber 80 into line 60, the resulting pressure rising in line 60 will act on piston 124 to move the intake valve element 118 to its closed position to shut off the flow to the pump intake through port 120. Moreover, the load on the hitch will cause fluid to drain from actuator 34 through port 78, line 56 and line 60 so long as valve element 74 is open. Furthermore, the fluid in line 60 will bleed out through port 130 and piston 124 and exhaust port 132 in the wall of intake valve 52, through the restricted orifice 84, and through a low pressure relief valve 135 having a valve element 135a to an exhaust port 136. When the hitch linkage reaches a position determined by the setting of position control lever 64, valve 74 will remain slightly open to accommodate the small amount of fluid continuously drawn through the bypass orifice 134 by the pump, and the volume of hydraulic fluid in the cylinder of actuator 34 will remain constant.

In draft control, the draft control handle 68 is moved to a position such that lever 66 will exert a force on the main valve element 74 sufficient to prevent valve 74 from opening beyond the balanced or steady state position unless the deflection of the draft spring departs from that deflection which corresponds to the desired working depth of the implement. Assuming the hitch linkage 12 initially to be in a transport or raised position, the draft control handle 68 is moved to a selected position determined by the desired working depth of the implement which in turn causes the lower end of lever 66 to move away from valve element 74. Spring 72 then causes valve 74 to move toward the right and increase the rate of flow from line 44 to line 56. Fluid drains from actuator 34 through line 48, line 46, port 78, line 56 and ports 92, 86 and 84 and relief valve 135 until the implement carried by the hitch linkage reaches a depth to develop a draft force sufficient to cause spring 30 to deflect toward the right, which deflection is transmitted through rod 36 to cause the lower end of lever 66 to swing toward the left and move valve 74 toward the left to decrease the flow through port 78. When the implement is at a depth such that the spring deflection of the draft spring is that which is called for by the control handle 68 setting, a steady state condition will be reached with valve 74 slightly open and pump 42 drawing fluid through the bypass orifice 134 sufficiently to maintain pressure in line 60 to close the intake valve element 118.

Valve element 118 is closed and remains closed during lowering of the hitch linkage, and the resulting flow of hydraulic fluid from actuator 34 escapes through relief valve 135. The hydraulic fluid pumped through the bypass orifice 134 when valve 74 is in its neutral position is sufficient to maintain shutdown pressure in line 60 to hold valve element 118 closed.

If for some reason the draft force on the implement should increase to cause a further deflection of the draft spring toward the right, lever 66 will move valve element 74 toward the left decreasing or shutting off the flow through port 78, and the pressure will fall in line 60 causing the intake valve element 118 to open, and the pump will deliver fluid through lines 46 and 48 to actuator 34 to raise the hitch linkage and decrease the deflection of the draft spring until the system returns to the steady state condition.

In either draft or position control, when valve element 90 is in a position to connect chamber 80 of the flow control valve 58 with line 60, the restriction in port 84, and the spring of the low pressure relief valve 135 maintains sufficient pressure in line 60 to cause piston 134 to close the intake valve element. The relief valve 135 prevents an excessive surge of pressure in line 60, and the restricted exhaust port 84 assures that the pressure in line 60 will fall to reservoir pressure when valve element 90 is in a position to shut off communication between chamber 80 and line 60.

The pressure in chamber 82 is always the same as that in line 48 except when valve 74 is opened, in which case the pressure across valve 90 is substantially balanced permitting spring 96 to shift valve element 90 to the left. While valve 90 is moving to the left, the pressure in chamber 82 may be higher than the pressure in line 48 due to the restriction established by the position of needle valve element 112 relative to orifice plate 108. The orifice plate 108 restricts movement of valve element 90 to the left while opening ports 92, but does not restrict closing of ports 92 by valve 90 since any increase in pressure in line 114 over that in line 102 unseats orifice plate 108 to immediately balance the pressure across the orifice plate. Thus, the needle valve 112 and orifice plate 108 establish a one way dash pot action for valve 90.

The flow control valve 58 performs two functions. It regulates the pressure across valve port 78. The flow rate or pressure through port 78 can never be greater than the spring force of spring 96. Spring 96 permits valve 76 to have a generous taper since a low pressure drop is maintained across port 78, and is substantially constant regardless of the pressure in actuator 34. Thus, with a selected opening of port 78, a relatively light weight implement will be lowered as rapidly as a heavy one.

The damping of the flow control valve element 90 toward its discharge position prevents the implement from falling too rapidly when transient shock loads move valve 74 rapidly.

When operating in pressure control, the position and draft control handles 64 and 68, respectively, are moved to position such that valve element 74 is held closed by levers 62 and 66, and the system is controlled by the pressure control valve 50. The pressure control valve 50 has an inlet port 138 connected with line 48 of the primary circuit, and an outlet port 140 connected with line 60 of the secondary circuit. Communication between ports 138 and 140 is controlled by a valve element 142 slideably in a bushing 144. The pressure in line 48 acts against valve element 142 to urge it upwardly against the force of a spring 146 received in a sleeve 148 and seated between a spring seat member 150 and a plunger 152 connected with a pressure control handle 154. Movement of the pressure control handle 154 toward the right increases the compression on spring 146 and thus increases the pressure required in line 48 to move valve 142 upwardly against the spring. The force is transmitted between the spring seat member 150 and valve element 142 by a cylindrical member 156. The lower end of valve element 142 is slotted as shown at 160, and when the pressure acting on valve element 142 from the primary circuit line 48 is sufficient to overcome the force of spring 146, valve 142 will rise in bushing 144 until slot 160 moves above wall 158 of the bushing permitting fluid to flow from line 48 through port 138 and slot 160 to port 140. Thus, in pressure control, the control handle 154 selects the deflection of spring 146 at which hydraulic fluid is discharged from actuator 34. The lift arm 24 will thus move upwardly until the pressure in line 48 is sufficient to cause a slight amount of oil to flow through slot 160 to port 140 and close the pump intake valve element 118.

Rapid discharge of hydraulic fluid from actuator 34 results in a greater relief area being exposed by the external chamfer on valve element 142. This chamfer, as illustrated, is preferably located just below the opening of slot 160 thus keeping pressure arising from excess discharge to a minimum. All hydraulic fluid escaping into the secondary circuit must escape through valve 135 or orifices 84 and 130.

The connection between the draft and position control handles 68 and 64 with their respective levers 66 and 62 are indicated schematically and may take any desired form, such as for example, the type shown in the above mentioned copending application of E. V. Bunting filed concurrently herewith.

While a specific embodiment of the invention has been illustrated and described, it should be understood that the invention is not limited to the exact construction shown but that other forms will be apparent to those skilled in the art, all of which fall within the scope and spirit of the invention.

I claim:
1. In a tractor having a hydraulic actuator for controlling an implement hitch linkage mounted on the tractor such that the delivery of hydraulic fluid to the actuator tends to raise the hitch linkage and the exhaust of hydraulic fluid from the actuator tends to lower the hitch linkage, hydraulic means for controlling the supply and exhaust of hydraluic fluid to and from the actuator, characterized in that said hydraulic control means include: a source of hydraulic pressure fluid, a fluid circuit for supplying hydraulic fluid from the source to the actuator and for exhausting fluid from the actuator, control means in the circuit responsive to pressure in a first portion of the circuit for controling the supply of fluid from the source to the actuator through a second portion of the circuit, regulating means in the circuit responsive to pressure in the second portion of the circuit to regulate the pressure in the first portion and to regulate the exhaust of fluid from the actuator, and hitch condition sensing means in the circuit for varying pressure in the second portion of the circuit in response to changes in a selected one of a plurality of controlled hitch linkage conditions, thereby regulating the exhaust of fluid from the actuator and regulating the pressure in the first portion of the circuit to cause the control means to control the flow of fluid from the source to the actuator and effecting return of the hitch linkage to the one selected condition.

2. The construction claimed in claim 1 wherein said regulating means is operable in supply, balanced and discharge conditions to respectively (1) decrease the pressure in the first portion of the circuit and shut off exhaust of fluid from the actuator to effect supply of hydraulic fluid to the actuator, (2) maintain a constant volume of hydraulic fluid at the actuator, and (3) increase the pressure in the first portion of the circuit and exhaust hydraulic fluid from the actuator.

3. The construction claimed in claim 1 wherein the source includes a reservoir and a constantly running pump; the control means comprises a normally open intake valve element controlling the fluid supply to the pump from the reservoir and a pressure responsive member connected with the intake valve element in pressure communication with the first portion of the circuit and responsive to increases in the first portion pressure to move the intake valve element toward its closed position; the first portion of the circuit has restricted exhaust communication with the reservoir; and the regulating means controls communication between the second portion of the circuit and the reservoir through the first portion of the circuit such that when the communication is established between the second and first portions of the circuit by the regulating means, hydraulic fluid exhausts from the actuator through the first portion of the circuit and at the same time causes the pressure to rise in the first portion of the circuit and move the intake valve element toward its closed position to reduce the supply of hydraulic fluid to the pump.

4. The construction claimed in claim 3 wherein said hitch condition sensing means include a main control valve having an inlet and an outlet with a valve port therebetween, means connecting the inlet with the second portion of the circuit and the outlet with the first portion of the circuit, a main control valve element controlling said port in response to changes in the hitch linkage condition being controlled, said main control valve element having supply, discharge and balanced positions relative to said port to respectively shut off flow through said port to effect supply of hydraulic fluid to the actuator, open said port to inter-connect the second and first portions of the circuit to exhaust hydraulic fluid from the actuator, and maintain a constant volume of hydraulic fluid at the actuator.

5. The construction claimed in claim 4 further including a bypass orifice connecting the pump with the reservoir when said intake valve is closed to permit the pump to continuously pump sufficient fluid into the second portion of the circuit to compensate for any leakage, said main control valve element, in its balanced position, permitting any excess hydraulic fluid from the pump to flow into the first portion of the circuit to maintain said constant volume of hydraulic fluid at the actuator.

6. The construction claimed in claim 5 wherein the regulating means include a flow control valve for controlling the rate of flow between the main control valve outlet and the first portion of the circuit in accordance with the differential between the pressure at the actuator and the pressure at the main control valve outlet.

7. The construction claimed in claim 6 wherein said flow control valve includes a valve element controlling flow between the main control valve outlet and the first portion of the circuit, said flow control valve element being subject on one side to pressure in the second portion of the circuit and on its other side to the main control valve outlet pressure and movable in response to increases in the pressure on said other side to establish flow from the main control valve outlet to the first portion of the circuit.

8. The construction claimed in claim 7 further including a restricted orifice in said flow control valve connected with the reservoir and controlled by the flow control valve element such that flow is established between the main control valve outlet and said restricted orifice by said flow control valve element simultaneously with the establishment of flow between the main control valve outlet and the first portion of the circuit.

9. The construction claimed in claim 8 further including a relief valve in the first portion of the circuit operable to vent excessive pressure in the first portion of the circuit to the reservoir.

10. The construction claimed in claim 9 further including a dashpot between the second portion of the circuit and said one side of the flow control valve element having an adjustable orifice therein for damping pressure surges to the flow control valve element from the second portion of the circuit.

11. The construction claimed in claim 10 further including a pressure control valve connected between the first and second portions of the circuit, said pressure control valve including a valve element biased to a closed position against the pressure in the second portion of the circuit and operable when the pressure in the second portion of the circuit overcomes the biasing force on the valve element to inter-connect the first and second portions of the circuit.

12. The construction claimed in claim 1 wherein said hitch condition sensing means comprises a pressure control valve between the first and second portions of the circuit operable to inter-connect the first and second portions of the circuit when the pressure in the second portion of the circuit exceeds a predetermined maximum.

13. The construction claimed in claim 12 wherein said pressure control valve is biased to a closed position against the pressure in the second portion of the circuit and moves to an open position to inter-connect the first and second portions of the circuit when the pressure in the second portion of the circuit is sufficient to overcome said biasing force such that said predetermined maximum pressure is determined by said biasing force.

14. The construction claimed in claim 13 wherein said hitch condition sensing means further comprises a main control valve having an inlet and an outlet with a valve port therebetween, means connecting the inlet with the second portion of the circuit and the outlet with the first portion of the circuit, a main control valve element controlling said port in response to changes in other controlled hitch linkage conditions, said main control valve element having supply, discharge and balanced positions relative to said port to respectively shut off flow through said port to effect supply of hydraulic fluid to the actuator, open said port to inter-connect the first and second portions of the circuit to exhaust hydraulic fluid from the actuator, and maintain a constant volume of hydraulic fluid at the actuator.

15. In a tractor having a hydraulic actuator for controlling an implement hitch linkage mounted on the tractor such that the delivery of hydraulic fluid to the actuator tends to raise the hitch linkage and the exhaust of hydraulic fluid from the actuator tends to lower the hitch linkage, hydraulic means for controlling the supply and exhaust of hydraulic fluid to and from the actuator, characterized in that said hydraulic control means include: a source of hydraulic pressure fluid, a fluid circuit for supplying hydraulic fluid from the source to the actuator and for exhausting fluid from the actuator, control means in the circuit responsive to pressure in a first portion of the circuit for controlling the supply of fluid from the source to the actuator, regulating means in the circuit responsive to pressure in a second portion of the circuit to regulate the pressure in the first portion and to regulate the exhaust of fluid from the actuator, and draft, position and pressure control means in the circuit alternatively operable respectively to (1) control the pressure in the second portion of the circuit in accordance with the draft forces imposed on the hitch linkage, (2) control the pressure in the second portion of the circuit in accordance with the position of the hitch linkage with respect to the tractor, and (3) control the pressure in the first portion of the circuit in accordance with the pressure in the second portion of the circuit.

References Cited

UNITED STATES PATENTS 2,689,513    9/1954    Ferguson et al. _____ 172—11

FOREIGN PATENTS 269,533    1/1964    Australia.

ROBERT E. BAGWILL, Primary Examiner

ALAN E. KOPECKI, Assistant Examiner